US009247145B2

(12) United States Patent  
Nihei

(10) Patent No.: US 9,247,145 B2  
(45) Date of Patent: Jan. 26, 2016

(54) IMAGE DISPLAY APPARATUS, IMAGE DISPLAY METHOD, AND COMPUTER-READABLE MEDIUM

(71) Applicant: CASIO COMPUTER CO., LTD., Shibuya-ku, Tokyo (JP)

(72) Inventor: Michihiro Nihei, Mitaka (JP)

(73) Assignee: Casio Computer Co., Ltd, Tokyo (JP)

( * ) Notice: Subject to any disclaimer, the term of this patent is extended or adjusted under 35 U.S.C. 154(b) by 56 days.

(21) Appl. No.: 14/107,685

(22) Filed: Dec. 16, 2013

(65) Prior Publication Data

US 2014/0104478 A1    Apr. 17, 2014

Related U.S. Application Data

(62) Division of application No. 12/556,651, filed on Sep. 10, 2009, now abandoned.

(30) Foreign Application Priority Data

Sep. 10, 2008   (JP) ................. 2008-232100

(51) Int. Cl.
| | |
|---|---|
| H04N 5/232 | (2006.01) |
| H04N 1/00 | (2006.01) |
| H04N 1/21 | (2006.01) |
| G09G 5/14 | (2006.01) |
| H04N 101/00 | (2006.01) |

(52) U.S. Cl.
CPC ....... *H04N 5/23293* (2013.01); *H04N 1/00442* (2013.01); *H04N 1/00448* (2013.01); *H04N 1/00458* (2013.01); *H04N 1/2112* (2013.01); *G09G 5/14* (2013.01); *H04N 2101/00* (2013.01); *H04N 2201/0084* (2013.01)

(58) Field of Classification Search
CPC ........... H04N 5/23293; H04N 5/23203; G06F 3/0485
USPC ........... 348/333.01, 211.4; 715/784, 788, 830
See application file for complete search history.

(56) References Cited

U.S. PATENT DOCUMENTS 5,453,796 A * 9/1995 Duffield et al. ............... 348/565  
5,500,743 A   3/1996 Sakaegi et al.  
(Continued)

FOREIGN PATENT DOCUMENTS

| JP | 11-066083 | 3/1999 |
|---|---|---|
| JP | 2006-268010 | 10/2006 |
| WO | 2007077554 | 7/2007 |

OTHER PUBLICATIONS

Japanese Office Action for 2008-232100 mailed Aug. 31, 2010.

(Continued)

*Primary Examiner* — Roberto Velez  
*Assistant Examiner* — Cynthia Segura  
(74) *Attorney, Agent, or Firm* — Amin, Turocy & Watson, LLP

(57) ABSTRACT

According to one embodiment, an image display apparatus includes a position specifying unit, a first display control unit, and a second display control unit. The position specifying unit specifies a retrieval start position indicating an arbitrary place within a predetermined order of images based on a user operation. The first display control unit controls displaying an image corresponding to the retrieval start position. The second display control unit changes the displayed image in the predetermined order.

15 Claims, 7 Drawing Sheets

(56) References Cited

U.S. PATENT DOCUMENTS

| | | | |
|---|---|---|---|
| 5,936,668 A * | 8/1999 | Sawanobori et al. | 348/333.01 |
| 6,268,854 B1 * | 7/2001 | Borden et al. | 715/786 |
| 6,738,075 B1 | 5/2004 | Torres et al. | |
| 6,833,848 B1 * | 12/2004 | Wolff et al. | 715/719 |
| 6,940,526 B2 * | 9/2005 | Noda et al. | 345/629 |
| 7,127,164 B1 * | 10/2006 | Parulski et al. | 396/287 |
| 7,327,347 B2 * | 2/2008 | Hilbert et al. | 345/156 |
| 7,454,711 B2 * | 11/2008 | Angiulo et al. | 715/760 |
| 7,466,357 B2 * | 12/2008 | Myojo | 348/333.05 |
| 7,552,187 B2 * | 6/2009 | Fuchs | 709/208 |
| 7,720,349 B2 | 5/2010 | Ogikubo | |
| 7,752,573 B2 * | 7/2010 | Shiba et al. | 715/835 |
| 8,081,252 B2 | 12/2011 | Furuya et al. | |
| 8,214,739 B2 * | 7/2012 | Yoritate et al. | 715/716 |
| 8,261,191 B2 | 9/2012 | Ording | |
| 8,346,771 B2 * | 1/2013 | Miyazaki | 707/737 |
| 8,395,637 B2 * | 3/2013 | Sano et al. | 345/581 |
| 8,429,555 B2 * | 4/2013 | Cho et al. | 715/784 |
| 8,957,866 B2 * | 2/2015 | Barnett et al. | 345/173 |
| 8,990,731 B2 * | 3/2015 | Park et al. | 715/831 |
| 2001/0015762 A1 | 8/2001 | Suzuki et al. | |
| 2003/0090504 A1 * | 5/2003 | Brook et al. | 345/716 |
| 2003/0156824 A1 * | 8/2003 | Lu | 386/68 |
| 2003/0169286 A1 | 9/2003 | Misawa | |
| 2004/0201752 A1 | 10/2004 | Parulski et al. | |
| 2005/0091596 A1 * | 4/2005 | Anthony et al. | 715/712 |
| 2005/0162718 A1 * | 7/2005 | Kim et al. | 358/537 |
| 2005/0190280 A1 * | 9/2005 | Haas et al. | 348/333.05 |
| 2006/0192881 A1 * | 8/2006 | Sato et al. | 348/333.05 |
| 2006/0203008 A1 | 9/2006 | Hiroshige | |
| 2007/0192741 A1 * | 8/2007 | Yoritate et al. | 715/828 |
| 2007/0279512 A1 * | 12/2007 | Maruyama et al. | 348/333.11 |
| 2008/0222558 A1 * | 9/2008 | Cho et al. | 715/784 |
| 2008/0263452 A1 * | 10/2008 | Tomkins | 715/730 |
| 2008/0297536 A1 * | 12/2008 | Matsuno et al. | 345/684 |
| 2009/0244320 A1 * | 10/2009 | Ito | 348/231.2 |
| 2009/0278997 A1 * | 11/2009 | Sano et al. | 348/739 |
| 2010/0002013 A1 * | 1/2010 | Kagaya | 345/619 |
| 2010/0277496 A1 * | 11/2010 | Kawanishi et al. | 345/589 |
| 2012/0072870 A1 * | 3/2012 | Akifusa | 715/830 |
| 2013/0187938 A1 * | 7/2013 | Sano et al. | 345/581 |
| 2014/0096070 A1 * | 4/2014 | Mishima et al. | 715/784 |

OTHER PUBLICATIONS

U.S. Office Action for U.S. Appl. No. 12/556,651 mailed on Sep. 16, 2011.

U.S. Office Action for U.S. Appl. No. 12/556,651 mailed on Feb. 8, 2012.

Japanese Office Action for 2010-243207 mailed Apr. 3, 2012.

U.S. Office Action for U.S. Appl. No. 12/556,651 mailed on Feb. 21, 2013.

U.S. Office Action for U.S. Appl. No. 12/556,651 mailed on Sep. 16, 2013.

* cited by examiner

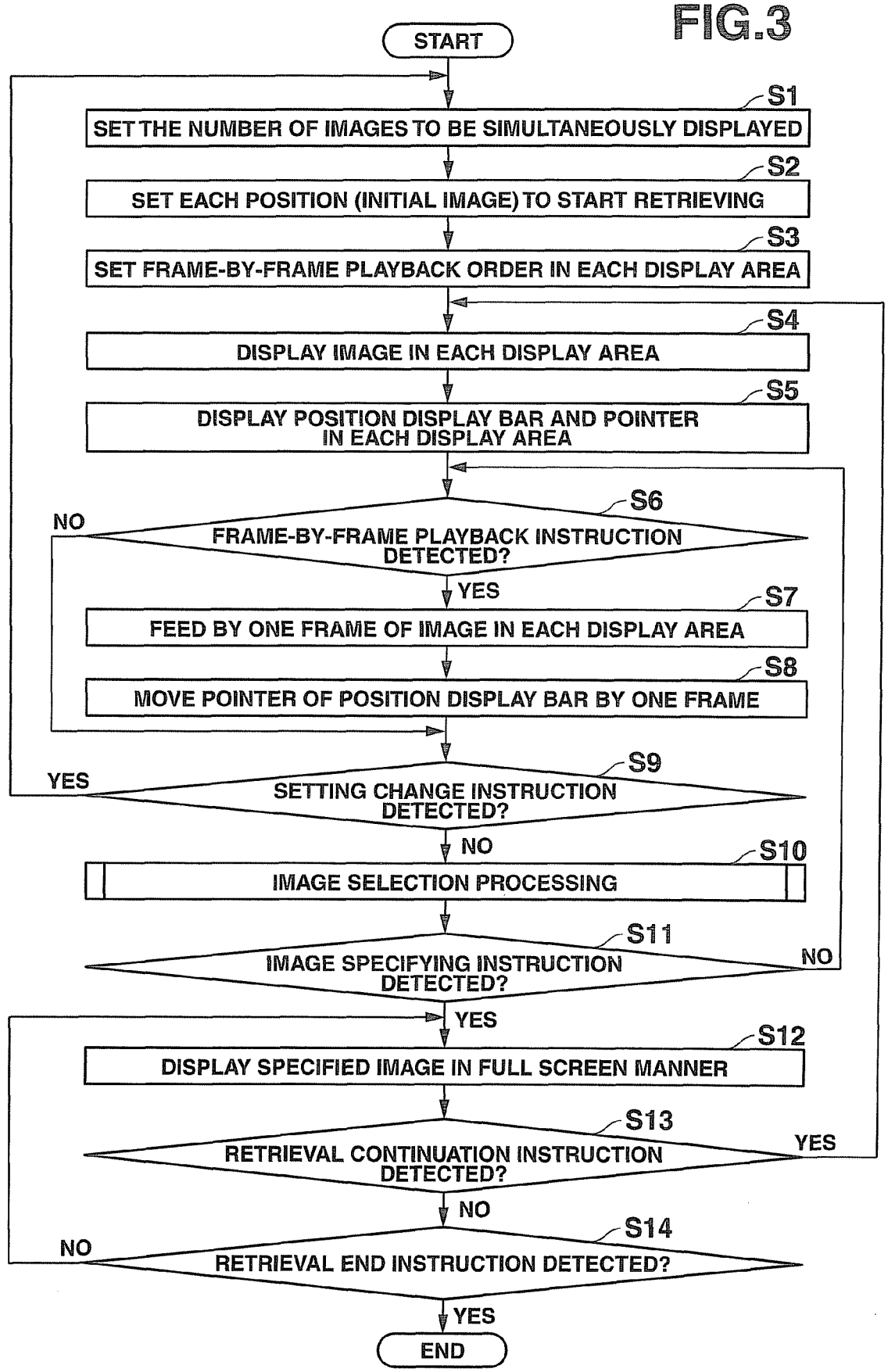

IMAGE DISPLAY APPARATUS, IMAGE DISPLAY METHOD, AND COMPUTER-READABLE MEDIUM

CROSS-REFERENCE TO RELATED APPLICATIONS

This application is a Division of application Ser. No. 12/556,651 filed Sep. 10, 2009, the entire contents of which are incorporated herein by reference.

This application is based upon and claims the benefit of priority from prior Japanese Patent Application No. 2008-232100, filed Sep. 10, 2008, the entire contents of which are incorporated herein by reference.

BACKGROUND OF THE INVENTION

1. Field of the Invention

The present invention relates to an image display apparatus and an image display method of displaying an image, and a computer-readable medium.

2. Description of the Related Art

Conventionally, a display device for a large number of images is disclosed (see Jpn. Pat. Appln. KOKAI Publication No. 2006-268010). The above display device manages the large number of images based on groups of images, classifies the images by the groups, displays images for each group simultaneously, and scrolls the displayed images for each group. According to this display device, a target image may be efficiently retrieved from the large number of images.

However, in the aforementioned conventional display device, when scrolling and displaying the images belonging to each group, the display device firstly displays an image positioned at the head of each group. That is, when retrieving the images belonging to each group, the display device is made to start to retrieve with the image positioned at the head of each group. Therefore, a problem, such that it still takes a long period of time to retrieve the target image, is posed in the conventional display device, for example, when the number of images belonging to each group is large.

To prevent such a problem, it is required to increase the number of the groups. However, the number of images to be simultaneously displayed on a screen, that is, the number of images to be recognized at once by a user is also increased. If the number of images to be simultaneously displayed on a screen is increased, the target image is difficult to recognize, which is similar to a case when images to be retrieved are displayed on the screen as a list of small-sized thumbnail images. Thus, the retrieval efficiency deteriorates if the number of the groups is increased.

BRIEF SUMMARY OF THE INVENTION

An image display apparatus according to one embodiment of the invention comprises a display device configured to display images; a position specifying unit configured to specify a retrieval start position indicating an arbitrary place within a predetermined order of images based on a user operation; a first display control unit configured to control displaying an image corresponding to the retrieval start position on the display device; and a second display control unit configured to change the image displayed on the display device in the predetermined order or a reverse order of the predetermined order.

An image display method according to another embodiment of the invention comprises specifying a retrieval start position indicating an arbitrary place within a predetermined order of images; displaying an image corresponding to the retrieval start position on a display device; and changing the image displayed on the display device in the predetermined order or a reverse order of the predetermined order.

According to another embodiment of the invention, a computer-readable medium having stored thereon an image display program which is executable by a computer, the image display program controlling the computer to execute functions of:

specifying a retrieval start position indicating an arbitrary place within a predetermined order of images;

displaying an image corresponding to the retrieval start position on a display device; and changing the image displayed on the display device in the predetermined order or a reverse order of the predetermined order.

BRIEF DESCRIPTION OF THE SEVERAL VIEWS OF THE DRAWING

FIG. 3 is a flowchart showing the processing procedure of a CPU in a retrieval display mode;

DETAILED DESCRIPTION OF THE INVENTION

Figure 1:
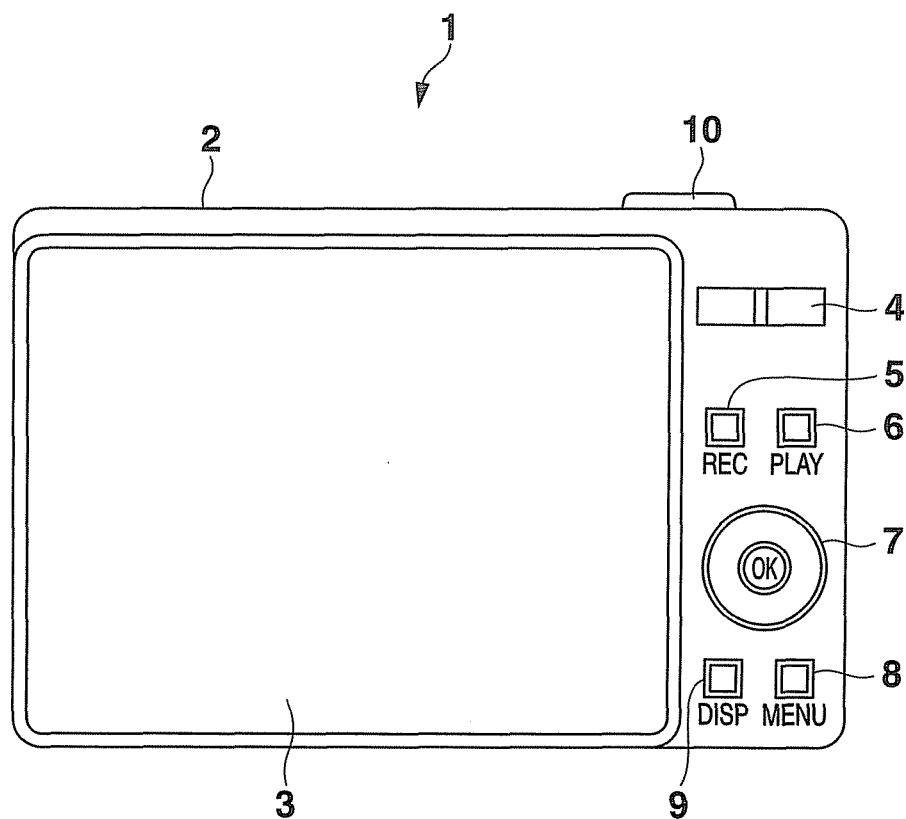
FIG. 1 is a rear face view of a digital camera according to an embodiment of the invention.

Hereinafter, one embodiment of the invention will be described with reference to the drawings. FIG. 1 shows a rear face view showing a digital camera 1 having a function as an image display apparatus of the invention. A liquid crystal display (LCD) monitor 3, a zooming key 4, a photographing (REC) key 5, a viewing (PLAY) key 6, a control key 7, a menu (MENU) key 8, and a display (DISP) key 9 are arranged on the rear face of a housing 2 of the camera 1. A shutter key 10 is arranged on the upper face of the housing 2. A memory card slot (not shown), on which a memory card 18 as a recording medium recording photographed images is detachably loaded, is arranged on the bottom face of the housing 2.

The REC key 5 and the PLAY key 6 are used for switching between a photographing (or recording) mode and a viewing (or reproducing) mode that are basic modes of the camera 1. The LCD monitor 3 is, for example, composed of a color liquid crystal display panel with a backlight. In a photographing standby state in the photographing mode, the monitor 3 displays a subject image (through image) and a variety of items of photographing information. The MENU key 8 is used for displaying various menu screens for various kinds of settings of the camera 1 on the LCD monitor 3. The DISP key 9 is used for switching information to be displayed on the LCD monitor 3. The control key 7 is a key selecting direction of upper, lower, right, and left, and fixing settings. The control key 7 is used for selecting items on the menu screen, selecting setting values of the selected items, and deciding setting content.

Figure 2:
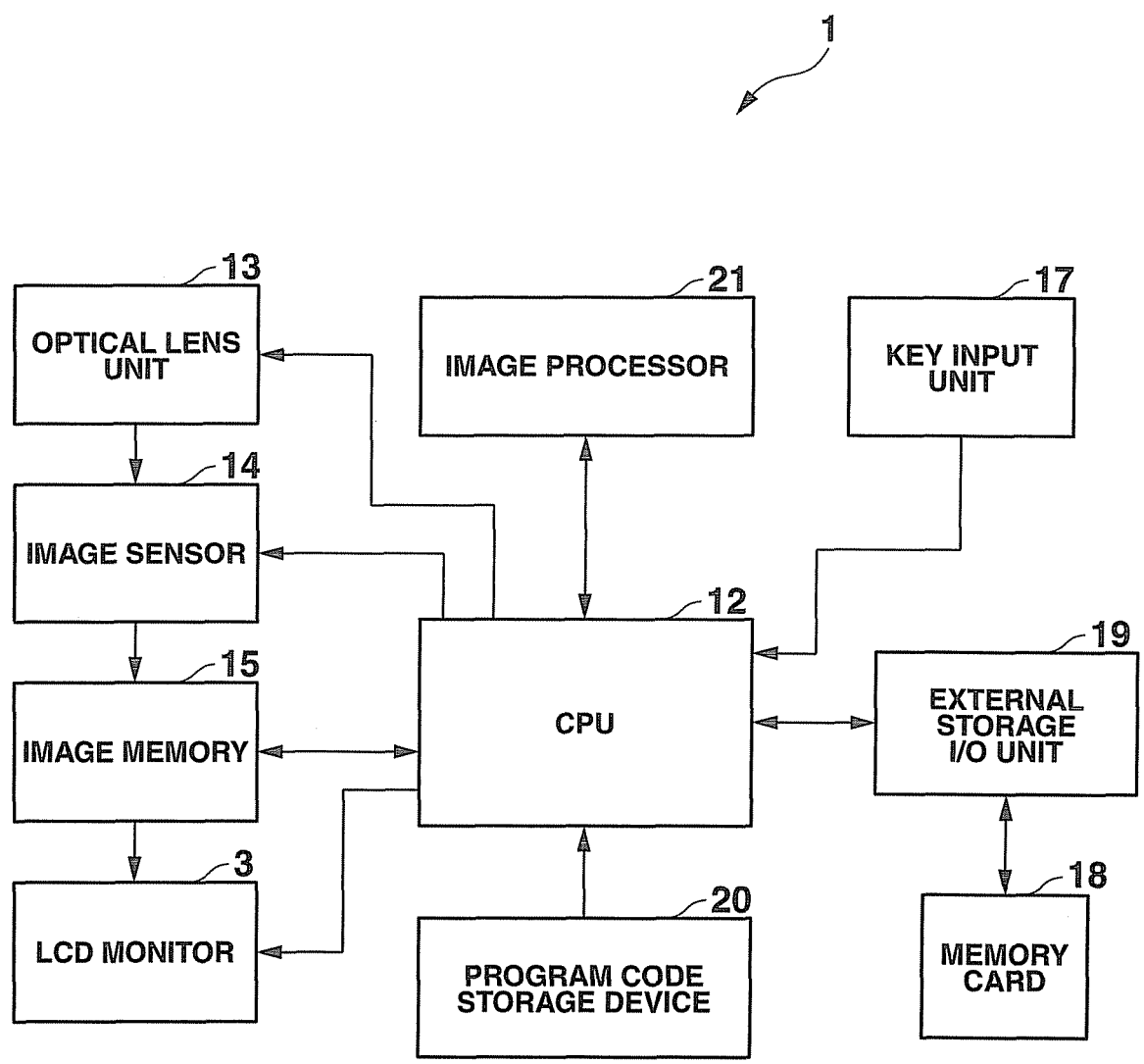
FIG. 2 is a block diagram of the digital camera.

FIG. 2 shows a block diagram showing the configuration of the digital camera 1. The camera 1 includes a CPU 12 controlling the entire device, and the following each unit is connected to the CPU 12. That is, an optical lens unit 13, an image sensor 14, an image memory 15, the LCD monitor 3, and a key input unit 17 are connected to the CPU 12. The optical lens unit 13 includes a focus lens and a zooming lens to focus an optical image of a subject. The image sensor 14 such as a CCD or a CMOS digitizes and captures the focused optical image. The image memory 15 includes an SDRAM, etc., temporarily stores the captured image. The key input unit 17 includes the aforementioned various keys and is periodically scanned by the CPU 12.

Further, an external storage I/O interface 19, a program code storage 20, and an image processor 21 are connected to the CPU 12, respectively. The external storage I/O interface 19 interfaces with the memory card 18 recording images. The program code storage 20 includes a ROM, etc., and stores programs for controlling the camera 1 by the CPU 12. The image processor 21 variously processes images captured with an image sensor 14, compresses a processed image data, and decompresses a compressed image data.

The program code storage 20 stores a program which makes the CPU 12 execute the various processing. The processing includes a position specifying control, an image display control, a display order setting control, and an information displaying control.

Next, operations of the camera 1 with the above mentioned configuration will be described. FIG. 3 shows a flowchart showing a processing procedure of the CPU 12 of a retrieval display mode prepared in advance as a lower layer mode of the viewing mode in the camera 1. The retrieval display mode is a mode prepared for a user to retrieve a target image from all recorded images stored in the memory card 18.

Figure 4A:
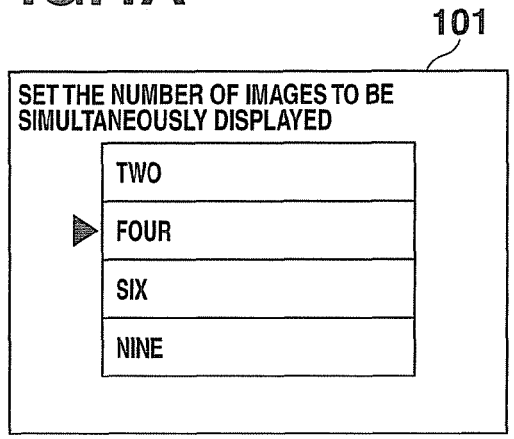
FIGS. 4A, 4B, 4C and 4D are transition diagrams of setting screen displayed in the retrieval display mode.

When the retrieval display mode is set, the CPU 12 displays, as shown in FIG. 4A, a screen 101 for setting the number of images on the LCD monitor 3. The screen 101 shows four numbers of images to be simultaneously displayed. The user operates the control key 7 and selects the number of images to be simultaneously displayed. The CPU 12 stores the selected number of the images as setting information (Step S1). The setting screen 101 shows two, four, six, and nine as a selectable number of images as shown in FIG. 4A. The user can select the desired number of images from among the numbers. Hereinafter, the operations of the camera 1 will be described assuming that "four" is selected as the number of images to be simultaneously displayed.

Figure 4B:
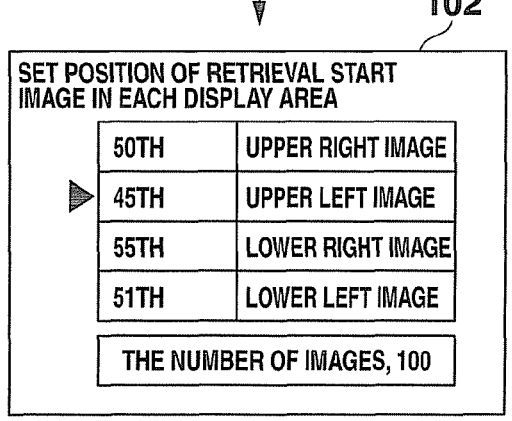
Figure 4C:
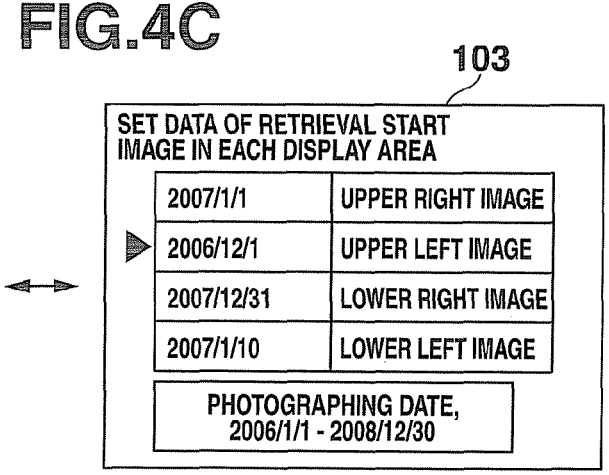

After selecting the number of the images, the CPU 12 displays on the LCD monitor 3 a first retrieval start position setting screen 102 as shown in FIG. 4B or a second retrieval start position setting screen 103 as shown in FIG. 4C. While displaying the first or second screen 102 or 103, the user operates the control key 7 to individually specify positions of retrieval start images (referred to as retrieval start positions) for display positions (referred to as display areas) of images which are preset in response to the number of images selected in advance. The CPU 12 also stores the retrieval start positions for the specified display areas as setting information (Step S2).

Figure 5A:
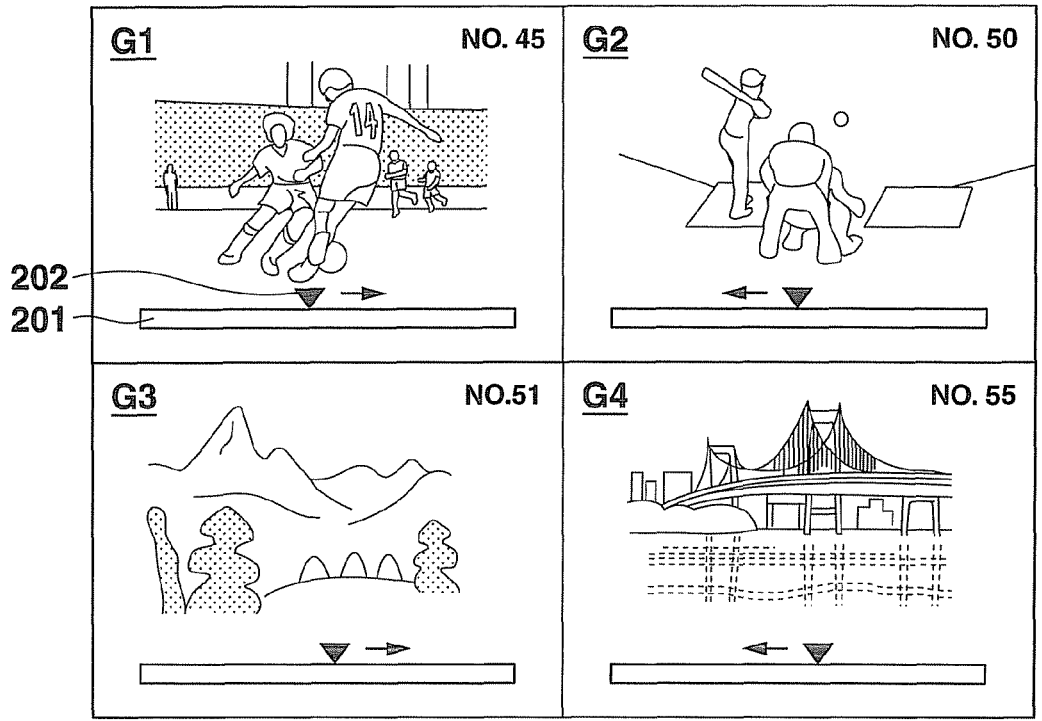
FIGS. 5A and 5B are display patterns of each image in the retrieval display mode.
Figure 5B:
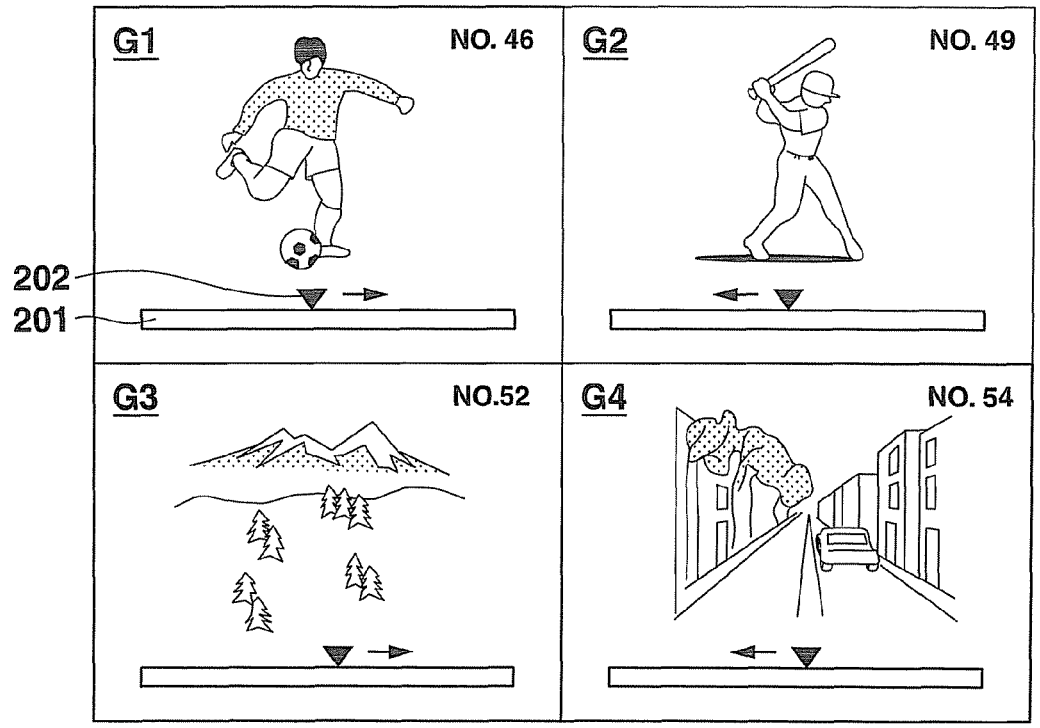

Not shown in the flowchart, immediately after completing the selection of the number of the images through the number of images setting screen 101 (Step S1), the CPU 12 may display the first retrieval start position setting screen 102. If a predetermined key operation is detected, the CPU 12 stops display of the first retrieval start position setting screen 102 and displays the second retrieval start position setting screen 103. After this, every time the predetermined key operation is detected, the CPU 12 switches display of the screens 102 and 103. As mentioned above, when "four" is selected in Step S1 as the number of images, the entire area of the display screen of the LCD monitor 3 is divided into four equal areas as shown in FIGS. 5A and 5B. The display areas include four areas of upper right, upper left, lower right, and lower left.

On the first retrieval start position setting screen 102, the CPU 12 displays the total numbers of the recorded images stored in the memory card 18 and the retrieval start position to specify which number of the images is specified among all the recorded images in each display area. On the second retrieval start position setting screen 103, the CPU 12 displays the oldest imaging date and the newest imaging date for all the recorded images stored in the memory card 18, and the retrieval start position to specify the photographing date in each display area.

In this embodiment, the order based on the photographing (recording) order of each recorded image is set as the retrieval start position. On the first retrieval start position setting screen 102, the retrieval start position is directly specified. On the second retrieval start position setting screen 103, the retrieval start position is indirectly specified. In the following description, it is assumed that the user uses the first retrieval start position setting screen 102 and specifies, as shown in FIG. 4B, the retrieval start position in each display area as follows: the 45th image for the upper left image (display area G1 shown in FIG. 5A), the 50th image for the upper right image (display area G2 shown in FIG. 5A), the 51st image for the lower left image (display area G3 shown in FIG. 5A), and the 55th image for the lower right image (display area G4 shown in FIG. 5A).

Figure 6:
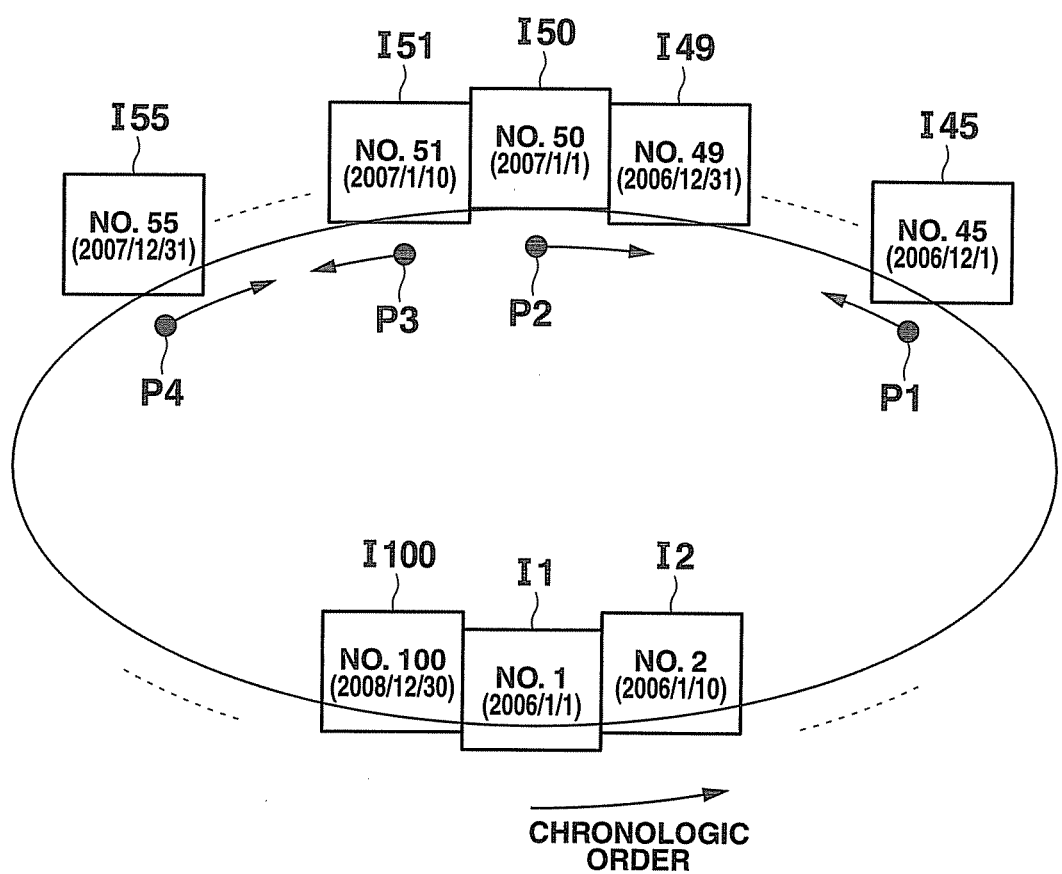
FIG. 6 is a schematic view showing pincer retrieval.

Referring to FIG. 6, the retrieval start positions will be described. FIG. 6 shows a schematic view illustrating an arrangement of all 100 images I1, I2, ... , I100 stored in the memory card 18 with respect to photographed date.

As mentioned above, if "four" is set as the number of images to be simultaneously displayed on the screen of the monitor 3, four images are displayed in the display areas G1-G4 as shown in FIG. 5A. The CPU 12 sets four retrieval pointers P1-P4 corresponding to the four display areas G1-G4, respectively as shown in FIG. 6. The retrieval pointers P1-P4 specify in turn the storage positions of image data to be read from the memory card 18 by the CPU 12. Initial values of the retrieval pointers are decided by the retrieval start positions.

The retrieval pointers P1-P4 are respectively set for the display areas G1-G4 arranged on the screen of the LCD monitor 3. That is, the number of images to be simultaneously displayed on the LCD monitor 3 (the number of display areas G1-G4 arranged on the monitor 3) equals to the number of retrieval pointers. The number of images to be simultaneously displayed is set in response to key operations by the user.

As described above, in the embodiment, the positions (retrieval start positions) of the images displayed in each display area G1-G4 are set in response to the key operations by the user when starting retrieval. Therefore, as shown in FIG. 6, each retrieval pointer P1-P4 is also set in response to the key operations by the user when starting the retrieval.

Figure 4D:
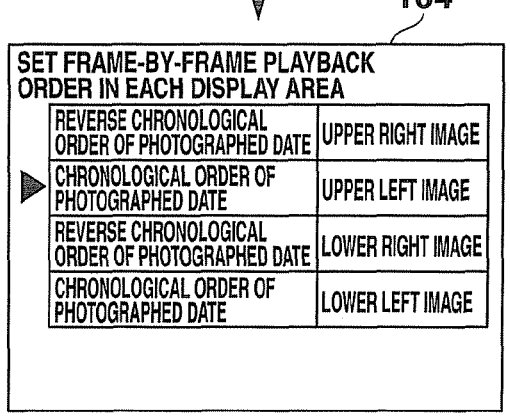

After selecting the number of the images to be simultaneously displayed, the CPU 12 displays a display order setting screen 104, shown in FIG. 4D, on the LCD monitor 3. The user individually set a frame-by-frame playback order (display order) when displaying the recorded images stored in the memory card 18. That is, the user sets whether the chronological order or reverse chronological order of photographed date as the frame-by-frame playback order. The set frame-by-frame playback order is stored as setting information (Step S3). In the description after this, it is assumed that the frame-by-frame playback order of upper right and lower right display areas G2 and G4 is set to the reverse chronological order of photographed date, and the frame-by-frame playback order of upper left and lower left display areas G1 and G3 is set to the chronological order of photographed date.

When frame-by-frame playback order is set in Step S3, whether the chronological order or reverse chronological order of photographed date is set to a moving direction of each retrieval pointer P1-P4 shown by each arrow in FIG. 6 in response to the key operations by the user.

After this setting, the CPU 12 reads each image data corresponding to the retrieval start position stored in Step S2 from the memory card 18, and also displays the images in the corresponding display areas G1-G4 on the screen of the monitor 3 respectively as shown in FIG. 5A (Step S4). If the photographed date has been specified by the second retrieval start position setting screen 103 as the retrieval start position, the CPU 12 reads image data matching with the specified date (if no matched image data exists, image data closest date to the specified date) among all the recorded images, and display the read image. Further, the CPU 12 displays on the LCD monitor 3 a position display bar 201 indicating the whole area of the retrieval area and a display pointer 202 visually indicating the retrieval position in order of photographing (order within decided order) of each displayed image in each display area (Step S5). The positions of the display pointer 202 displayed on the position display bar 201 become recorded positions of the image data indicated by the retrieval pointers P1-P4 in the storage area of the image data in a retrieval range. At this moment, a number indicating the order of the image based on the order of photographed date is displayed in each display area.

After this, when detecting the key operation for a frame-by-frame playback instruction (YES in Step S6), the CPU 12 moves, by one frame, the positions of the retrieval pointers P1-P4 corresponding to the display areas G1-G4, respectively, in a direction according to the frame-by-frame playback order. Then, images specified by the moved retrieval pointers P1-P4 are displayed in the display areas G1-G4, respectively. Thereby, as shown in FIG. 5B, the respective images shown in the display areas G1-G4 are changed from the respective images, displayed in the display areas G1-G4 immediately before the frame-by-frame playback is instructed, into images photographed before or after the respective images in accordance with the frame-by-frame playback order which has been set in Step S3 (Step S7).

In addition, the CPU 12 moves the display positions of the respective display pointers 202 in the respective display areas G1-G4 by one frame in a direction in accordance with the frame-by-frame playback order. That is, the CPU 12 moves the display positions of the respective display pointers 202 to positions corresponding to order of photographed date specified by the moved retrieval pointers P1-P4 (Step S8). After this, the CPU 12 repeats the processing in the foregoing Steps S7 and S8 at every time of detection of key operations of the frame-by-frame playback instruction. The display images are changed in turn in the respective display areas G1-G4. Thus, the user can retrieve the target image while seeing images by instructing the frame-by-frame playback.

When detecting the key operations for setting change instructions (NO in Step S6 and YES in Step S9), the CPU 12 repeats aforementioned setting processing for the number of images to be displayed simultaneously, retrieval start positions, and the frame-by-frame playback order (Steps S1-S3), and executes the display processing based on the new settings (Steps S4 and S5).

When the key operations for frame-by-frame playback instruction and for setting change instruction are not detected (NO in Steps S6 and S9), the CPU 12 executes image selection processing (Step S10). The image selection processing displays an image specifying frame, etc., in one of the display areas G1-G4, and moves the image specifying frame, etc., to select an image in an arbitrary display area in response to direction instructions of upper, lower, right or left using the control key 7 by the user. When the user does not instruct the direction of upper, lower, right, or left using the control key 7, the image selection processing ends.

When the CPU 12 does not detect the key operation for the image specifying instruction by the user (NO in Step S11), the flow returns to Step S6. When the CPU 12 detects the key operation of the image specifying instruction (YES, Step S11), the CPU 12 displays the image selected by the image specifying frame on the monitor 3 in full screen (Step S12). Thereby, the user can see the specified image in detail.

While the specified image is displayed in the full screen, the CPU 12 sequentially recognizes the key operation for a retrieval continuation instruction by the user, and the key operation for a retrieval end instruction. When the key operation of the retrieval continuation instruction is detected (YES in Step S13), the flow returns to Step S4 to perform the foregoing processing based on the retrieval start position for each display area. That is, the CPU 12 switches the screen on the monitor 3 to the screen immediately before displaying the specified image in the full screen in Step S12.

Then, while the specified image is displayed in the full screen, when detecting the key operation of the retrieval end instruction by the user (YES in Step S14), the CPU 12 ends the processing in the retrieval display mode.

When the user retrieves the target image from images displayed in the retrieval display mode, the intention of the user may be reflected to the procedure of the image retrieval, and a target image may be efficiently retrieved since the user may freely set the position of an image starting the retrieval (retrieval start position indicating the numerical order based on the order of photographed date) from among all the images to be displayed (retrieved), that is, since the user may set the image to be displayed at first in the display areas G1-G4. That is, if the user recognizes the position of the target image (date and time of photographing) in all images to a certain extent, a position range, which has been marked out already, can be retrieved selectively by setting the retrieval start position according to the recognized position, and the target image can be reached quickly.

Since the embodiment sets a plurality of retrieval start positions, and may individually display images differing in retrieval start positions in a plurality of display areas in the screen, the embodiment may simultaneously retrieve a plurality of position ranges which have been marked out already. While plural settable (selectable) retrieval start positions (display areas) are set in the embodiment, they may only be one retrieval start position (display area); but even in this case, the intention of the user may be reflected to the procedure in the image retrieval and the target image may be efficiently retrieved.

In the embodiment, not only plural retrieval start positions can be set, but also the number of the retrieval start positions, that is, the number of the display areas can be changed if necessary. Therefore, for example, when the number of images to be displayed which are recorded in the memory card 18 is very large, a retrieval rate can be increased if the number of the retrieval start positions (display areas) is increased. When the user marks the positions of images to be targeted among all the images out accurately so that the retrieval range may be limited to a narrow range, the individual images can be easily seen if the number of the retrieval start positions (display areas) is decreased and each display area (display size of each image) is enlarged.

Further, in the embodiment, since the user can freely set the frame-by-frame playback order in each display area, the user can efficiently retrieve the target image. More specifically, as mentioned above, if the user has recognized the position range (date and time, etc., of photographing) of the target image to a certain extent, the user sets the head and the end of the position range to the retrieval start positions respectively, as shown in FIGS. 4B and 4C, and the frame-by-frame playback order in the display area (upper right and lower right in examples of FIGS. 4B and 4D), in which the retrieval start positions on the head side is set, is set to the reverse chronological order of photographed date, and also the frame-by-frame playback order in the display area (upper left and lower left in examples of FIGS. 4B and 4D), in which the retrieval start position on the end side is set, is set to the chronological order of photographed date. Then, the retrieval range can be gradually narrowed from both of the head and the end, and the target image can be retrieved in a pincer manner. Hereinafter, this retrieval is referred to as pincer retrieval. FIG. 6 shows a schematic view showing the pincer retrieval when the setting of the number of images to be displayed simultaneously, the retrieval start positions, and the frame-by-frame playback order are exemplified in FIGS. 4A-4D.

Moreover, in the embodiment, since the position display bar 201 and the display pointer 202 indicating the retrieval position of each displayed image are displayed in the respective display areas G1-G4, the user can intuitively recognize the present retrieval position based on the position of the display pointer 202 on the position display bar 201.

In the embodiment, although the user may set the frame-by-frame playback order for each display area, and perform the pincer retrieve if necessary, the following configuration may be also usable. For instance, on the assumption that the digital camera 1 performs the pincer retrieval, the number of the settable images is limited to an even number. Thereby, the user sets the head of the retrieval range as a retrieval start position of one of a pair of display areas, and sets the end of the retrieval range as a retrieval start position of the other of the pair of the display areas. The frame-by-frame playback order of the one of the pair of the display areas with the head of the retrieval range being set as the retrieval start position is fixed to the chronological order of photographed date, the frame-by-frame playback order of the other of the pair of the display areas with the end of the retrieval range being set as the retrieval start position is fixed to the reverse chronological order of photographed date.

In the embodiment, although the frame-by-frame playback order of the display image is restricted only in one direction according to the preset order of the frame-by-frame playback, the invention may be configured to enable the user to advance one image at a time in an inverse direction to the frame-by-frame playback order preset by the user through prescribed key operations if necessary. Further, the invention may be configured to automatically conduct the frame-by-frame playback of the display image in each display area, regardless of the presence or absence of the frame-by-frame playback instruction by the user, for each fixed time interval.

[Modified Embodiment]

Hereinafter, a modified embodiment in which the retrieval start positions are settable at two points will be described. For instance, if the pincer retrieval is performed, the user sets two points on the head side and the end side in the retrieval range as the retrieval start positions, and the frame-by-frame playback order for each display area is fixed, and if the user sets the two points of the retrieval start positions regardless of a retrieval method and arbitrarily sets the frame-by-frame playback order for each display area, the CPU 12 may conduct the following processing in a retrieval display mode, after the user sets the retrieval start positions and the frame-by-frame playback order.

Figure 7A:
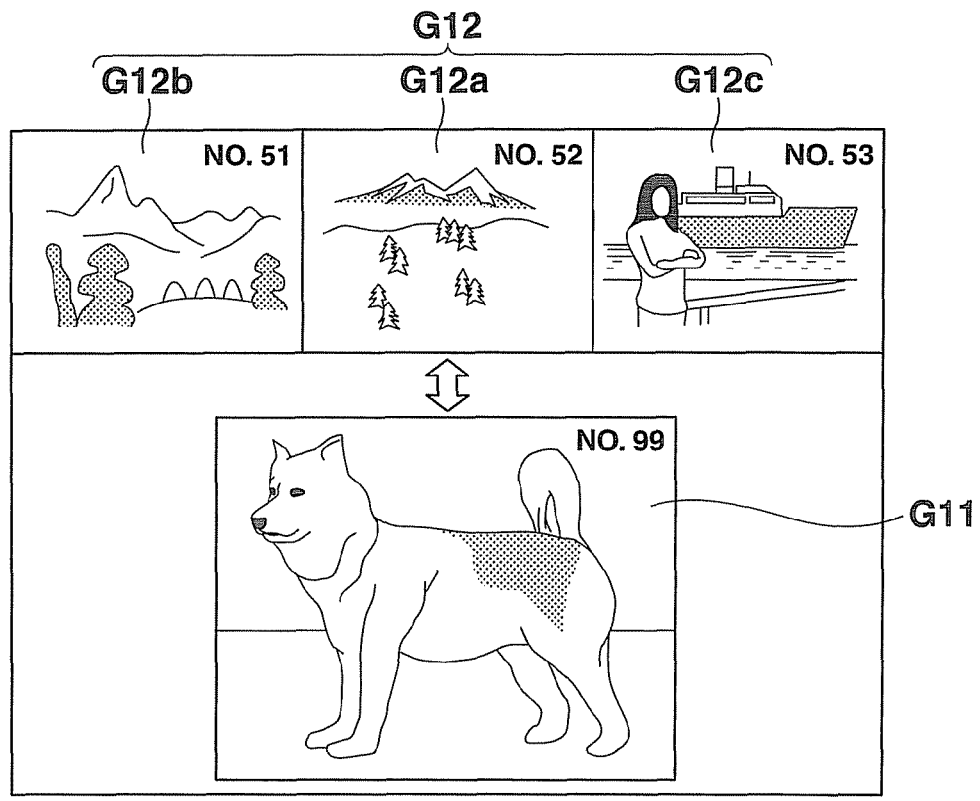
FIGS. 7A and 7B are display patterns of each image in a retrieval display mode of a modified embodiment.

Firstly, after setting the retrieval start positions and the frame-by-frame playback order, the CPU 12 makes the display screen of the LCD monitor 3 perform the processing for displaying the images corresponding to the set retrieval start positions in the display form shown in FIG. 7A. That is, the display screen of the LCD monitor 3 includes a first display area G11 with a relatively large area, and a second display area G12 composed of a main area G12a and two sub-areas G12b, G12c forming a line at the right and left sides of the main area G12a. The main area G12a and the two sub-areas G12b, G12c are smaller than the area G11 respectively. The CPU 12 displays an image corresponding to one retrieval start position of the head side, etc., in the retrieval range in the first display area G11. At the same time, the CPU 12 displays an image corresponding to the other retrieval start position on the end side, etc., in the retrieval range in the main area G12a of the second display area G12, displays a first image in the sub-area G12b on the left side of the main area G12a, the first image preceding the image displayed in the main area G12a and displays a second image in the sub-area G12c on the right side of the main area G12a, the second image succeeding the image displayed in the main area G12a.

When detecting the key operation of the frame-by-frame playback instruction by the user, the CPU 12 maintains the shown display form, and changes each image in the first display area G11 and the second display area G12 into images preceding and succeeding each image. That is, the CPU 12 scrolls each image of three images by one frame in the second display area G12.

Figure 7B:
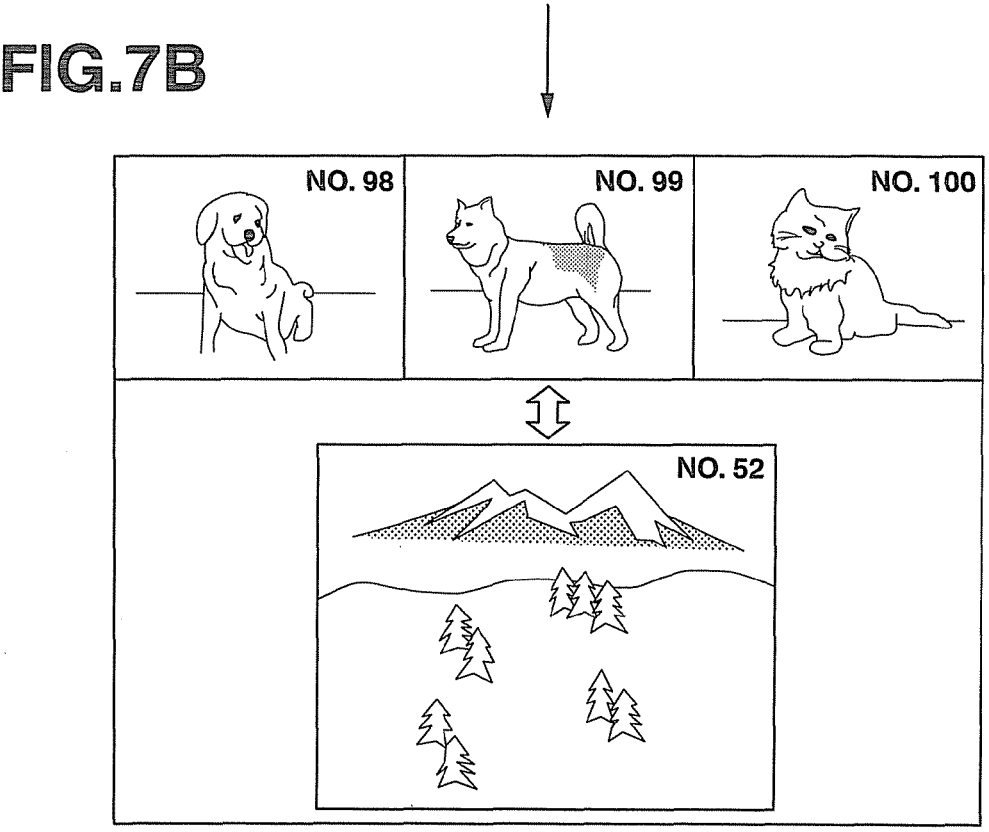

Further, when the CPU 12 detects the key operation of the image switching instruction by the user, the CPU 12 displays the image displayed in the first display area Gil in the main area G12a of the second display area 12, displays new images, preceding and succeeding the image displayed in the main area G12a, in the sub-areas G12b, G12c, and displays the image which has been displayed in the main area G12a, in the first display area G11. After this, the CPU 12 repeats the foregoing processing in response to the frame-by-frame playback or image switching instruction by the user. That is, if the user inputs image switching instruction in the state shown in FIG. 7B, the CPU 12 returns to the state shown in FIG. 7A.

During the display of images in the foregoing display form, similarly to the aforementioned embodiments, since the CPU 12 executes the image selection processing, the user can select either the image in the first display area G11 or the image in the main area G12a of the second display area G12. When the CPU 12 detects the key operation of the image specifying instruction by the user, the CPU 12 may display the specified image in the full screen. The CPU 12 may enable the user to input only the setting change instruction or the retrieval end instruction.

Even in the modified embodiment, when the user retrieves the target image by seeing a plurality of images, since the user may freely set the retrieval start position, the user may reflect his/her intention to the procedure of the image retrieval, and may efficiently retrieve the target image. Since the user may simultaneously retrieve two position ranges with marks put thereto, and may perform the pincer retrieval, the user may efficiently retrieve the target image.

When a plurality of images are displayed in the foregoing display form, even if the user only sets one position and not two positions for the retrieval start position, and the user fixes the order of the frame-by-frame playback in the first display area Gil and the second display area G12 in reverse order, since two different position ranges may be retrieved simultaneously, the target image can be efficiently retrieved.

While the given explanation has described the case where the order of the frame-by-frame playback display order of the images on the monitor 3 is the standard photographing order, the invention is not limited to such a case, and another case may be adopted as the standard of the order of the frame-by-frame playback, and a combination of a plurality of standards may be adopted. As regards another standard, for example, a name of a file of image data or a data size of an image can be used.

While the invention has been described in the case for use in a digital camera, the invention may be applied to other camera devices such as a digital video camera and a cellular phone with a camera and an arbitrary image display apparatus such as a personal computer as long as a device has an image display function. In such a case, images to be displayed (to be retrieved) are not limited to images which are always captured by photographing, and other images can be used.

According to the invention, when retrieving the target image by seeing a plurality of images, even if a large quantity of images need to be retrieved, efficient image retrieval may be achieved.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image display controlling apparatus comprising:
   a memory that stores instructions; and
   a processor, coupled to the memory, that executes the instructions for causing the image display controlling apparatus to perform operations, comprising:
      acquiring a plurality of images, wherein the plurality of images have uniquely allocated numbers;
      in response to a first user operation, independently specifying a first display start position and a second display start position among the allocated numbers of the plurality of images for displaying images on a first area and a second area of a display;
      a first controlling of the display to display a first image of the plurality of images on the first area and a second image of the plurality of images on the second area, wherein the first image and the second image are able to be scrolled to respective next images among the plurality of images; and
      a second controlling of the display to display the first image on the second area and the second image on the first area so as to exchange the position of the first image and the position of the second image, wherein the exchanged first image and the second image are able to be scrolled to respective next images among the plurality of images.

2. The image display controlling apparatus according to claim 1, the operations further comprising: wherein;
   the first controlling of the display to display a first image on the first area and a second image on the second area, wherein the first image and the second image are able to be scrolled to respective next images in increasing order and a decreasing order of the allocated numbers; and
   the second controlling of the display to display the first image on the second area and the second image on the first area so as to exchange the position of the first image and the position of the second image, wherein the exchanged first image and the second image are able to be scrolled to respective next images in increasing order and a decreasing order of the allocated numbers.

3. The image display controlling apparatus according to claim 1, the operations further comprising
   detecting an instruction for exchanging the position if the first image and the position of the second image; wherein
   the second controlling exchanges the position of the first image and the position of the second image when the instruction is detected.

4. The image display controlling apparatus according to claim 1, the operations further comprising
   selecting at least one specific image from images on the first area and the second area; and
   enlarging the selected specific image when the selected image is displayed.

5. The image display controlling apparatus according to claim 1, wherein
   the second area is smaller than the first area.

6. The image display controlling apparatus according to claim 1, wherein
   the second controlling, in response to an user operation, exchanges the display position of the first image and the display position of the second image.

7. The apparatus according to claim 1, the operations further comprising:
   the second controlling simultaneously changes the position of the first image and the position of the second image in response to a second user operation.

8. The apparatus according to claim 1, the operations further comprising,
   displaying indicators each of which indicates one of the increasing order and the decreasing order with the first image and the second image.

9. The apparatus according to claim 1, wherein, the first controlling of the display to display the first image on the first area and to display the second image and third images preceding and succeeding the second image on the second area and third areas preceding and succeeding the second area, respectively, wherein the first image and the second image and the third images are able to be scrolled to respective next images in increasing order and a decreasing order of the allocated numbers.

10. The image display controlling apparatus according to claim 1, wherein the plurality of images are related to each other.

11. The image display controlling apparatus according to claim 1, wherein the plurality of images are in a single folder.

12. The image display controlling apparatus according to claim 1, wherein the plurality of images are included in one memory card.

13. The image display controlling apparatus according to claim 1, wherein the plurality of images are photo images.

14. An image display method, comprising:
- acquiring, by a system comprising a processor, a plurality of images, wherein the plurality of images have uniquely allocated numbers;
- in response to a first user operation, independently specifying, by the system, a first display start position and a second display start position among the allocated numbers of the plurality of images for displaying images on a first area and a second area of a display;
- controlling, by the system, the display to display a first image of the plurality of images on the first area and a second image of the plurality of images on the second area, wherein the first image and the second image are able to be scrolled to respective next images among the plurality of images; and
- controlling, by the system, the display to display the first image on the second area and the second image on the first area so as to exchange the position of the first image and the position of the second image, wherein the exchanged first image and the second image are able to be scrolled to respective next images among the plurality of images.

15. A non-transitory computer-readable medium having stored thereon computer executable instructions for causing a computer to perform the steps of:
- acquiring a plurality of images, wherein the plurality of images have uniquely allocated numbers;
- in response to a first user operation, independently specifying a first display start position and a second display start position among the allocated numbers of the plurality of images for displaying images on a first area and a second area of a display;
- controlling the display to display first image of the plurality of images on the first area and a second image of the plurality of images on the second area, wherein the first image and the second image are able to be scrolled to respective next images among the plurality of images; and
- controlling the display to display the first image on the second area and the second image on the first area so as to exchange the position of the first image and the position of the second image, wherein the exchanged first image and the second image are able to be scrolled to respective next images among the plurality of images.

* * * * *